…

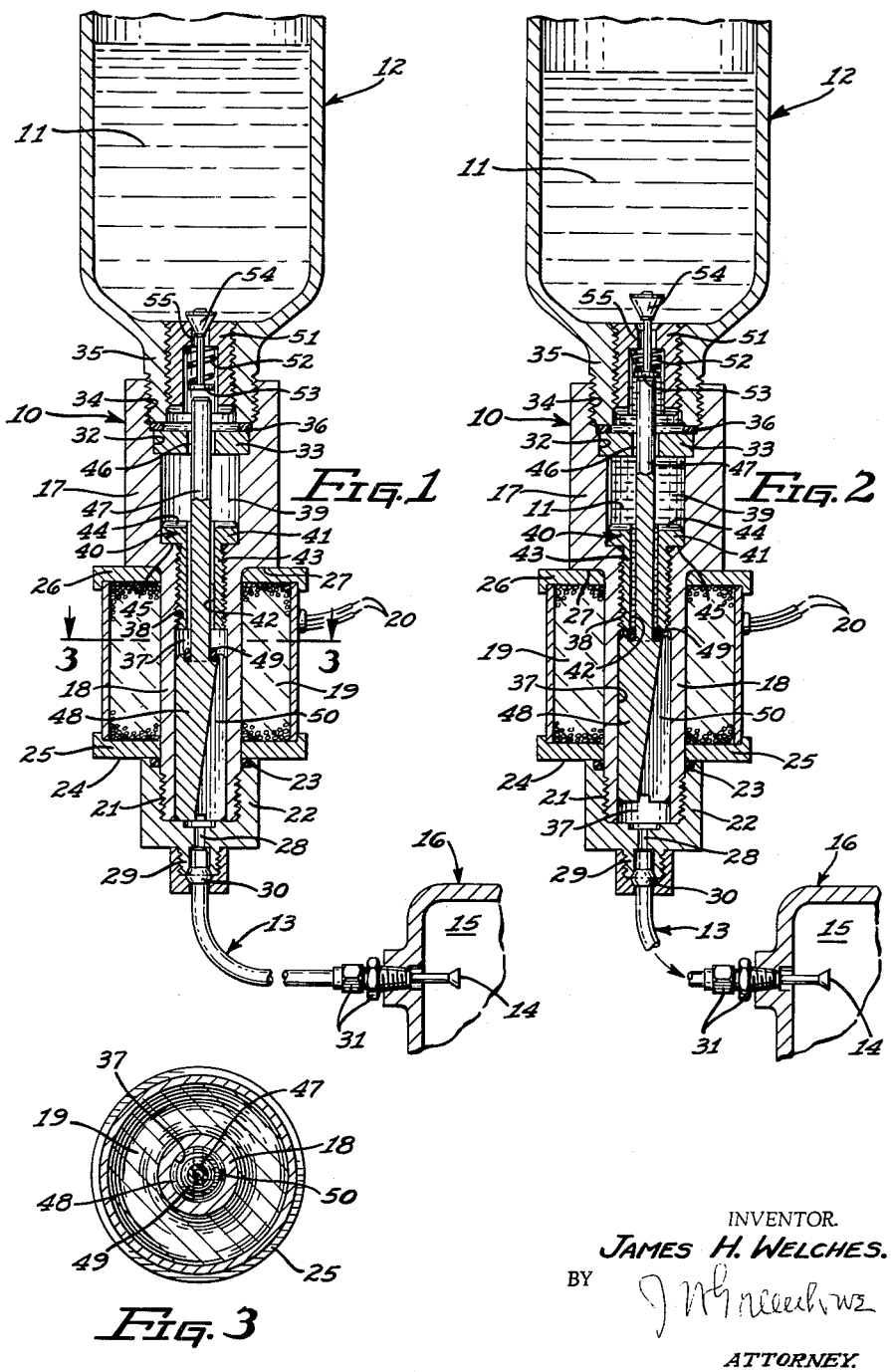

United States Patent Office 3,198,404
Patented Aug. 3, 1965

3,198,404
PRESSURIZED DISPENSER HAVING AN ELECTRO-MAGNETIC VALVE
James H. Welches, 1021 N. 28th St., Phoenix, Ariz.
Filed Aug. 13, 1963, Ser. No. 301,787
6 Claims. (Cl. 222—394)

This invention pertains to an electro-magnetic valve and is particularly directed to a measuring valve adapted to dispense a predetermined volume of high volatile fuel to an internal combustion engine for the purpose of obtaining a fast start and at extremely low temperatures.

The principal object of the invention is to provide a simply constructed, electrically operated, measuring valve which is adapted to measure and deliver a specific amount of fluid fuel from a pressurized container or flow line to the manifold of an internal combustion engine when activated by electric energy.

Another object of the invention is to provide an electro-magnetic measuring valve which is adapted to temporarily store a specific measured volume of pressurized high volatile liquid fuel in a suitable sealed chamber when an electro-magnet is activated by an electric current, and to automatically deliver the specific volume of pressurized liquid fuel in a finely atomized condition into the manifold of an internal combustion engine upon deactivation of the electromagnet.

A further object of the invention is to provide a measuring valve in which the specific amount of fluid fuel to be measured and delivered to the manifold, may be easily adjusted, by the insertion of spacers or washers to the measuring chamber thereby reducing the volume of said chamber.

Other objects and advantages of the invention will appear and be more fully understood by reference to the following description together with the accompanying drawings which form a part of this specification and in which:

FIG. 1 is a vertical sectional view incorporating the features of this invention showing the elements of the valve in their deactivated relation, and the association of a pressurized fuel container and engine manifold therewith.

FIG. 2 is a vertical sectional view of the valve and associated parts of FIG. 1 showing the elements of the valve in their activated relation.

FIG. 3 is a transverse section on line 3—3 of FIG. 1.

As an example of one embodiment of the present invention there is shown in the drawings an electro-magnetic measuring valve indicated in general by the reference numeral 10 which receives its supply of liquid fuel 11 from a pressurized fuel tank or container 12 and delivers the liquid fuel through a suitable pipe line 13, in a finely atomized condition through a nozzle or jet 14 to the interior 15 of an intake manifold 16 which is associated with the combustion chambers of an internal combustion engine (not shown) in the usual manner.

Referring specifically to the construction of the valve 10 which comprises a body portion 17 which is preferably hexagon shaped for ease of assembly and has an integral depending reduced cylindrical portion 18 which extends through and acts as the core of a conventional electromagnet or solenoid 19 having the leads 20 which may be connected to a suitable electrical power source such as a battery (not shown).

The lower end of the cylindrical portion 18 is externally threaded as at 21 to receive a suitable hex fitting 22 which is secured upwardly to compress an "O" ring 23 tightly against the under surface 24 of the lower solenoid cover plate 25. The upper solenoid cover plate 26 is adapted to abut the under abutment surface 27 of the valve body 17, therefore the tightening of the hex fitting 22 securely clamps the solenoid assembly in position surrounding the valve portion 18 and seals the valve assembly 10 from loss of pressurized fuel.

The hex fitting 22 is provided with a central bore 28 and an externally threaded boss 29 which is adapted to receive a conventional compression fitting 30 attached to the valve end of the pipe line 13 in sealed relation therewith and through the bore 28, the pipe line 13 and the conventional fittings 31, to conduct pressurized fuel to the manifold 16 by way of the nozzle jet 14. The upper end of the valve body 17 is provided with a counterbore 32 which is adapted to receive a guide washer 33, and an internal thread 34 which is adapted to receive the threaded neck portion 35 of the pressurized fuel container 12 in sealed relation by means of an "O" ring 36 which is interposed between the top surface of the guide washer 33 and the under surface of the neck 35 of the container.

The reduced cylindrical portion 18 of the valve 10 is provided at its lower end with a central bore 37 which extends upwardly about two-thirds the height of the solenoid 19 and has a reduced internally threaded bore 38 which extends upwardly and opens into the cylindrical measuring chamber 39. A guide bushing 40 having a flat cylindrical head 41, a central clearance bore 42 and a male threaded shank 43, is threaded into the matching threaded bore 38 by means of a spanner wrench slot 44 until the bottom surface 45 of the head 41 abuts the flat bottom surface of the chamber 39.

The guide washer 33 previously mentioned is also provided with a clearance bore 46 in alignment with the clearance bore in the guide bushing 40 which bores together form a suitable liquid passage and guide means for an actuating stem portion 47 integral with armature or core 48, which has a sliding fit for up and down movement in the central bore 37. The armature 48 is provided at its upper and with a counterbore which provides a seat for a sealing "O" ring 49, and an angular slot 50 which extends from the top outer edge of the armature to the bottom surface, and provides direct communication between the upper end of bore 37 to the bore 28 in the fitting 22 and thence to the pipe line 13, the purpose of which will hereafter be explained.

The fuel container 12 as previously described is filled with a high volatile liquid fuel under pressure which may be supplied to the measuring chamber 39 by means of a suitable valve 51 which is secured in the neck 35 of the container and is normally held in closed position by the downward pressure of the liquid in the container and a compression spring 52 which also exerts downward pressure on the valve stem actuating disk 53 thereby securely holding the tapered valve plunger 54 seated in the valve port 55.

Having thus described the associated elements which constitute the present invention, I will now describe the operation of the device when supplying a measured volume of pressurized fuel to the manifold of an internal combustion engine.

As clearly shown in FIG 1 all the parts of the device are at rest in their deactivated relation, with the valve plunger 54 seated in the port 55 thereby preventing any leakage of fuel into the measuring chamber 39. When it is desired to supply the engine manifold 16 with a measured amount of fuel, the electro-magnet or solenoid 19 is energized by passing an electric energy from any suitable source through the leads 20 thereto. Activation of the solenoid immediately causes the armature 48 to move upwardly in the central bore 37 forcing the "O" ring 49 into contact and sealed relation with the bottom end of the clearance bore 42. Simultaneously with this action, the core actuating stem 47 which is preferably integral with the armature is moved upwardly and contacts the actuating disk 53 to compress the spring 52 thereby lifting the plunger 54 and opening the port 55 to communication with the measuring chamber 39. The combined simultaneous described actions allow only enough pressurized fuel to flow from the container 12 to completely fill the measuring chamber 39 and its associated clearance bores 42 and 46, but prevents any fuel from passing beyond the sealing "O" ring 49, thereby storing a measured amount of pressurized fuel in the chamber 39 ready for delivery to the manifold 16 as shown in FIG. 2. It should be understood that the volume of fuel thus stored could be readily varied by the insertion of flat washers into the measuring chamber 39.

Deenergizing of the solenoid 19 by cutting off the electrical energy by means of a suitable switch (not shown) allows the armature to drop to the bottom of the bore 37, thereby eliminating the seal at the "O" ring 49 and allowing the spring 52 to close the valve 51 by dropping the plunger 54 to close the port 55. This action again closes the fuel container 12 from any communication with the measuring chamber 39 and associated bores and allows the pressurized liquid fuel to pass through the clearance bore 42 into the top of the bore 37, thence down through the angular slot 50 into the bore 28, through the pipe line 13, into the nozzle jet 14, from which it is released in the form of a highly volatile spray or vapor into the interior 15 of the manifold 16.

From the foregoing description it will be apparent that the invention provides an extremely accurate, simply constructed measuring valve which is operated electrically and is capable of automatically delivering a specific volume of highly volatile fuel to the manifold of an engine by the simple manipulation of an electrical switch by an operator.

While the apparatus herein disclosed and described constitutes a preferred form of the invention, it is to be understood that modifications may be made therein without departing from the spirit and scope of the invention as set forth in the appended claims.

Having thus fully set forth and described this invention, what is claimed and desired to be obtained by United States Letters Patent is:

1. A dispenser having an electro-magnetic valve for discharging a measured amount of liquid fuel from a container comprising, a pressurized container having a neck portion, a measuring chamber adjacent to said neck portion, a fuel supply valve in said neck portion of said container, a solenoid having an armature, said armature having a fluid passage, said armature operating to open said fuel supply valve for the flow of fuel into said measuring chamber when said solenoid is energized, a seal member mounted on said armature to prevent the flow of fuel from said chamber when said fuel supply valve is open, said armature operating to close said fuel supply valve and actuate said seal member for the flow of fuel from said measuring chamber through said passage when said solenoid is deenergized.

2. A dispenser having an electro-magnetic valve for discharging a measured amount of liquid from a container comprising, a container, a measuring chamber integral with said container, a fuel supply valve intermediate said container and said measuring chamber, a solenoid having an armature, said armature having a stem portion for actuating said fuel supply valve for the flow of fuel into said measuring chamber when said solenoid is energized, said armature having a fuel passage, a seal member mounted on said armature for sealing said passage to prevent the flow of fuel from said chamber when said fuel supply valve is open, said armature operating to close said fuel supply valve and release the flow of fuel from said measuring chamber through said fuel passage when said solenoid is deenergized.

3. A dispenser having an electro-magnetic valve for discharging a measured amount of liquid from a container comprising, a container, a measuring chamber integral with said container, a fuel supply valve intermediate said container and said measuring chamber, a solenoid having an armature for actuating said fuel supply valve for the flow of fuel into said measuring chamber when said solenoid is energized, said armature having a longitudinal slot, said valve having a passage for the flow of liquid from said chamber to said slot, a seal member mounted on said armature for sealing said passage to prevent the flow of fuel from said chamber when said fuel valve is open, said armature operating to close said fuel supply valve and release the flow of fuel from said chamber for passage through said slot when said solenoid is deenergized.

4. A dispenser having an electro-magnetic valve for discharging a measured amount of liquid from a container comprising, a body portion having a passage therethrough, a pressurized fuel container secured to said body portion at one end of said passage, said container having a fuel supply valve for the control of the flow of fuel from said container into said passage, a measuring chamber in said passage in alignment with said fuel supply valve, a solenoid coil adjacent to said body portion and having an armature movable in said passage, a slot intermediate said armature and said body portion forming part of said passage, a discharge outlet at the other end of said passage, said armature operating when said solenoid is energized to open said fuel supply valve for the flow of fuel into said measuring chamber, said armature operating to seal said chamber against the release of fluid into said slot and to cause said fuel supply valve to close and movement of said armature operating to unseal said chamber, when said solenoid is deenergized, for the flow of fuel from said chamber through said passage and discharge outlet.

5. A dispenser having an electro-magnetic valve for discharging a measured amount of liquid from a container comprising, a body portion having a passage therethrough, a pressurized fuel container secured to said body portion at one end of said passage, said container having a fuel supply valve for the control of the flow of fuel from said container into said passage, a measuring chamber in said passage in alignment with said fuel supply valve, a solenoid intermediate the ends of said body portion and having an armature movable in said passage, said armature having an actuating stem portion, a discharge outlet at the other end of said passage, said armature operating, when said solenoid is energized, to move said stem to open said fuel supply valve for the flow of fuel into said measuring chamber, said armature operating to seal said chamber against the release of fluid therefrom, said stem causing said fuel supply valve to close and movement of said armature operating to unseal said chamber, when said solenoid is deenergized, for the flow of fuel from said chamber through said outlet.

6. A dispenser having an electro-magnetic valve for discharging a measured amount of liquid from a container comprising, a body portion having a passage therethrough, a pressurized fuel container having a neck portion secured to said body portion at one end of said passage, said container having a fuel supply valve in said neck portion for the control of the flow of fuel from said container into said passage, a measuring chamber in said passage in alignment with said fuel supply valve, a solenoid surrounding said body portion and having an armature movable in said passage, said armature having an actuating stem portion, a discharge outlet at the other end of said passage, said armature operating when said solenoid is energized to move said stem to open said fuel supply valve for the flow of fuel into said measuring chamber, said armature operating to seal said chamber against the release of fluid therefrom, said stem portion causing said fuel supply valve to close and movement of said armature operating to unseal said chamber, when said solenoid is deenergized, for the flow of fuel from said chamber through said discharge outlet.

References Cited by the Examiner

UNITED STATES PATENTS

| | | | |
|---|---|---|---|
| 941,760 | 11/09 | Cordley | 222—449 X |
| 3,072,302 | 1/63 | Giovannoni | 222—453 X |
| 3,073,490 | 1/63 | Dahl et al. | 222—504 |

LOUIS J. DEMBO, *Primary Examiner.*